United States Patent
Luther et al.

(10) Patent No.: US 7,077,576 B2
(45) Date of Patent: Jul. 18, 2006

(54) FIBER OPTIC CONNECTION FOR APPLYING AXIAL BIASING FORCE TO MULTIFIBER FERRULE

(75) Inventors: James P. Luther, Hickory, NC (US); Terry L. Cooke, Hickory, NC (US); Michael deJong, Ft. Worth, TX (US); Robert B. Elkins, II, Hickory, NC (US); Lars K. Nielsen, Denver, NC (US); Thomas Theuerkorn, Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 196 days.

(21) Appl. No.: 10/675,352

(22) Filed: Sep. 30, 2003

(65) Prior Publication Data
US 2005/0069264 A1 Mar. 31, 2005

(51) Int. Cl.
*G02B 6/38* (2006.01)

(52) U.S. Cl. ............................. 385/59; 385/55; 385/58; 385/60; 385/66; 385/68; 385/69; 385/76; 385/77; 385/78; 385/84; 385/86

(58) Field of Classification Search .................. 385/59
See application file for complete search history.

(56) References Cited

U.S. PATENT DOCUMENTS

| 5,214,830 A | 6/1993 | Rozycki ....................... 29/240 |
| 5,590,229 A | 12/1996 | Goldman et al. ............. 385/59 |
| 6,439,778 B1 * | 8/2002 | Cairns .......................... 385/60 |
| 6,648,520 B1 * | 11/2003 | McDonald et al. ........... 385/78 |
| 6,811,322 B1 | 11/2004 | Chen et al. ................... 385/78 |
| 2005/0025432 A1 | 2/2005 | Chen et al. ................... 385/78 |

FOREIGN PATENT DOCUMENTS

WO    WO97/34176    9/1997

* cited by examiner

Primary Examiner—Frank G. Font
Assistant Examiner—Ryan Lepisto
(74) Attorney, Agent, or Firm—Christopher C. Dremann

(57) ABSTRACT

A fiber optic connector includes a multifiber ferrule and at least one force centering element for applying a biasing force to the ferrule in the longitudinal direction without introducing a moment about a lateral axis. The connector further includes a coil spring for exerting the biasing force and a spring seat disposed between the coil spring and the ferrule. The rearward portion or the forward portion of the spring seat may be provided with a pair of outwardly extending protrusions that are laterally spaced apart to transfer the biasing force to the ferrule. Alternatively, the forward portion of the spring seat or the rear face of the ferrule may define a convex surface. Alternatively, the ferrule defines a convex surface in the direction of a first lateral axis and the spring seat defines a convex surface in the direction of a second lateral axis perpendicular to the first lateral axis.

4 Claims, 11 Drawing Sheets

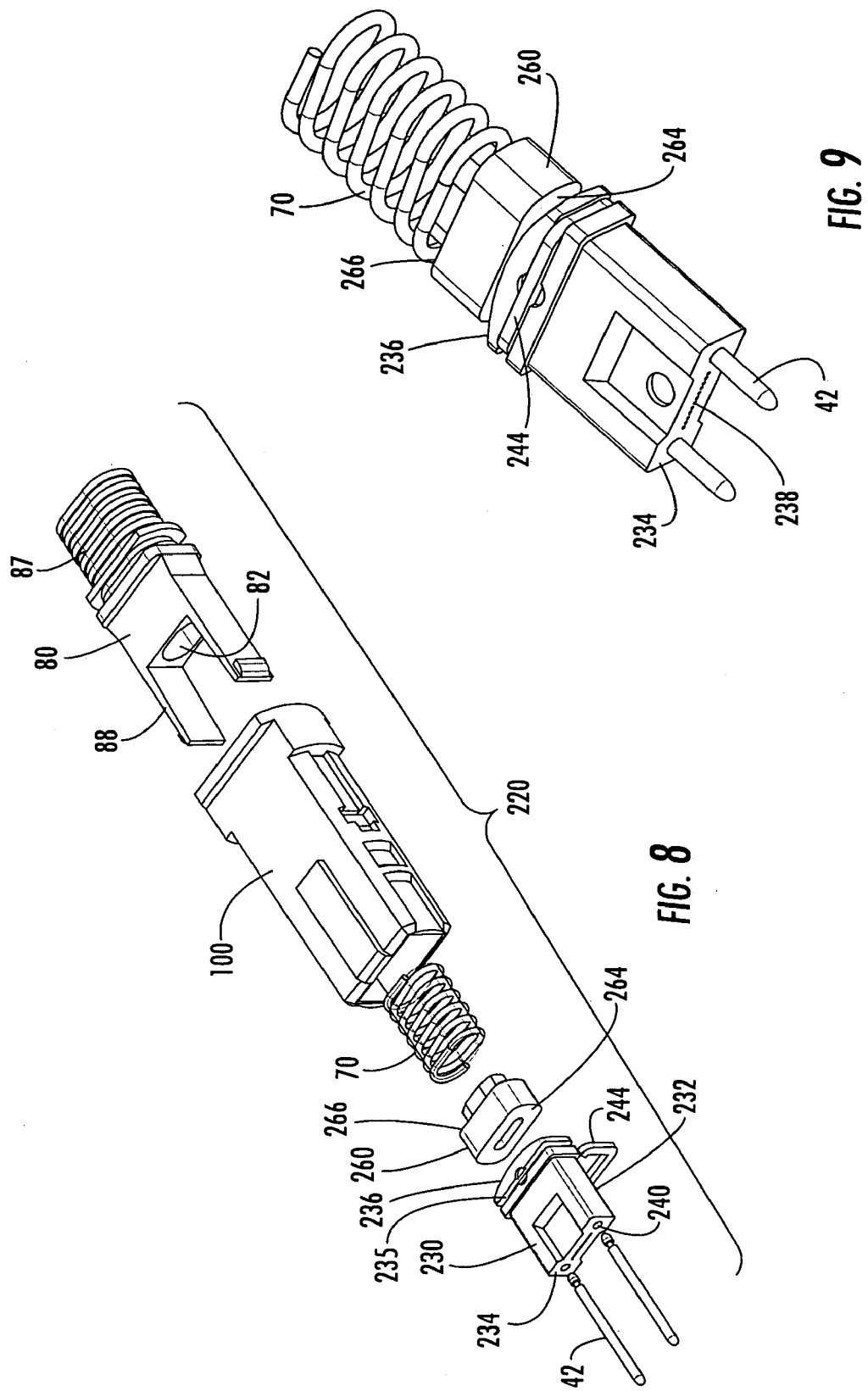

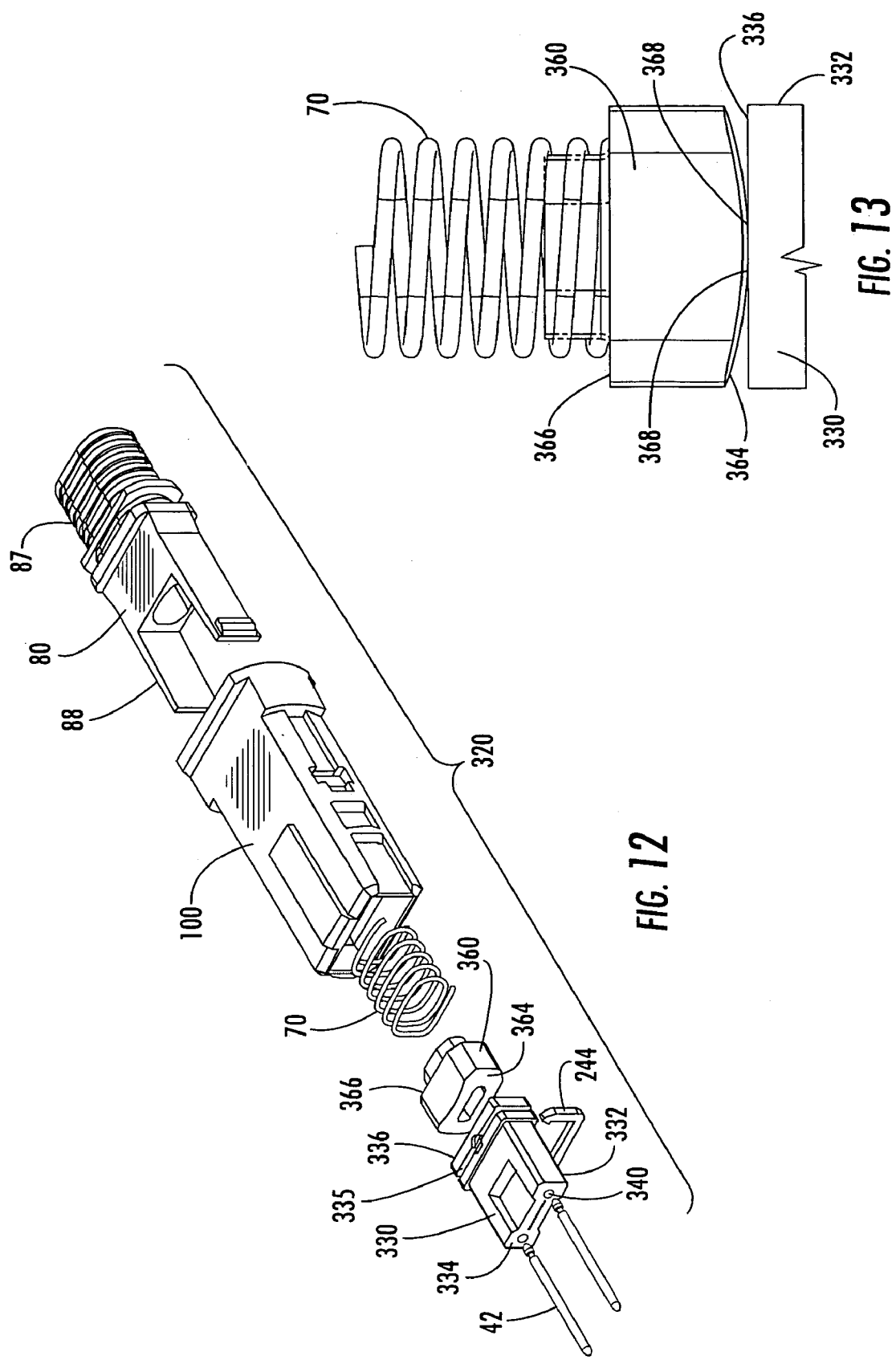

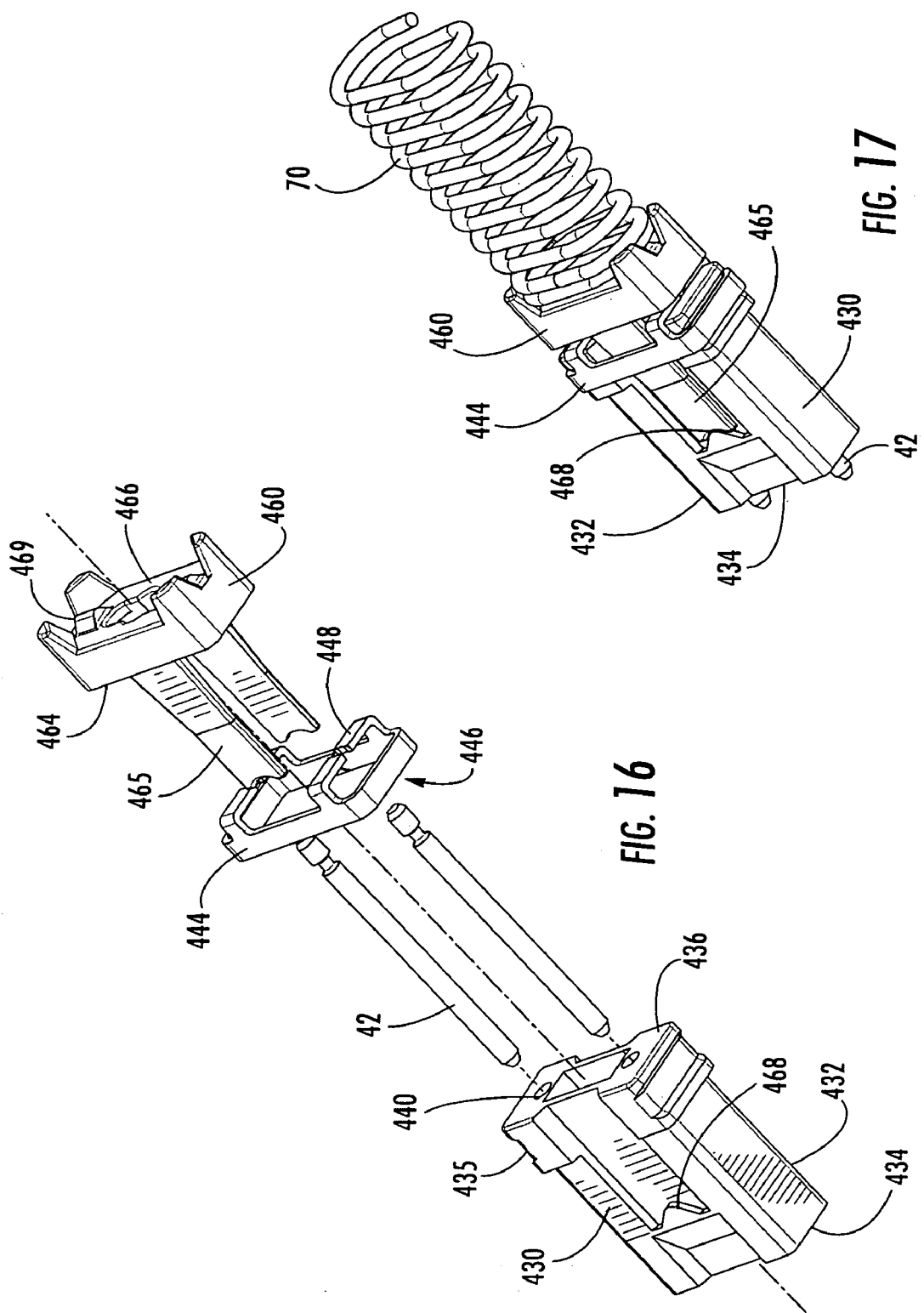

FIBER OPTIC CONNECTION FOR APPLYING AXIAL BIASING FORCE TO MULTIFIBER FERRULE

BACKGROUND OF THE INVENTION

The present invention relates generally to fiber optic connectors, and more particularly, to a fiber optic connector including a multifiber ferrule and means for applying an axial biasing force to the ferrule.

The proliferation of optical communications and data transfer has dramatically increased the use of fiber optic connectors including multifiber ferrules for simultaneously interconnecting a plurality of optical fibers. Not only are multifiber connectors being utilized in greater numbers, but increased performance demands are being placed upon the optical connections between mated connectors. As a result, there is an increased demand in optical communications for what has become generally known as "low-loss, intermateable, multifiber connectors." For example, in order to maximize signal transmission between pairs of opposed optical fibers, multifiber connectors are required to align each of the optical fibers very precisely, especially for single mode applications. In this regard, multifiber connectors are typically required to align each optical fiber to within about 7 to 14 microns for multimode applications and to within about 0 to 3 microns for single mode applications.

In order to provide the desired alignment, conventional multifiber ferrules define a pair of elongate alignment holes that receive and cooperate with respective alignment members, such as guide pins, to accurately align opposing ferrules, and in turn, the optical fibers mounted within the multifiber ferrules. For example, one conventional type of multifiber ferrule is the MT (Mechanically Transferable) ferrule, such as described by U.S. Pat. No. 5,214,830 to Sinji Nagasawa, et al., and assigned to Nippon Telephone and Telegraph Corporation of Tokyo, Japan. The MT ferrule has a generally rectangular shape in lateral cross-section and defines a pair of guide pin holes and a plurality of optical fiber bores opening through the end face of the ferrule. The guide pin holes receive respective guide pins to align the optical fibers of a pair of opposing MT ferrules.

The pair of MT ferrules that are to be interconnected are typically configured such that one of the multifiber connectors has a male configuration and the other multifiber connector has a female configuration. The male configuration of the multifiber connector includes a pair of guide pins that have been inserted within the guide pin holes defined by the MT ferrule and extend forwardly beyond the end face. In contrast, the female configuration of the multifiber connector includes an MT ferrule that defines a pair of guide pin holes for receiving the portions of the guide pins that extend beyond the end face of the male MT ferrule. During mating, insertion of the guide pins into the guide pin holes defined by the female MT ferrule aligns the male and female connectors, and in turn, aligns the optical fibers mounted within the MT ferrules. In order to snugly receive the guide pins, the guide pin holes defined by a conventional MT ferrule are cylindrical in lateral cross-section so as to have the same size and shape along their entire length. By utilizing cylindrical guide pin holes, the sidewalls of the guide pin holes contact the guide pins along their entire length, thereby maximizing the alignment provided by the guide pins.

The MT ferrules of the male and female fiber optic connectors are biased towards one another so as to interconnect the optical fibers with a minimum amount of attenuation. It has long been believed that "dry physical contact" (i.e., physical contact between opposing optical fibers without the use of index-matching gel) across all of the pairs of optical fibers of mated multifiber connectors could be achieved by controlling the geometry of the opposing optical fibers and ferrules. However, significant advances in geometry control, such as optimal fiber height, array uniformity, optical fiber angle, core dip and ferrule end face angle, have not consistently resulted in dry physical contact across all of the optical fibers of opposing multifiber connector pairs. Further analysis of the factors preventing dry physical contact of the optical fibers has shown that the force applied to bias the ferrule in the axial direction of the mating ferrule very often produces a moment about a lateral axis of the ferrule. In other words, the biasing force is not always applied along the longitudinal axis of the ferrule, or at the least, is not balanced about the longitudinal axis of the ferrule.

Typically, the biasing force is generated by a coil spring mounted within a connector housing between the rear face of the ferrule and a spring push. An off-axis biasing force oftentimes results because the coil spring buckles within the connector housing and introduces a component of the spring force that is offset from the longitudinal axis of the ferrule, or is applied at an angle other than normal to the end face of the ferrule. Even if the coil spring does not buckle, the geometry and inherent nature of the coil spring makes it likely that an unbalanced biasing force will be applied to the rear face of the ferrule in a direction other than along the longitudinal axis. As a result, the biasing force will apply an undesired moment to the ferrule in addition to the desired axial force. Thus, despite the presence of substantially perfect geometry features in mating optical fibers and ferrules, a biasing force that is not applied along the longitudinal axis of a multifiber ferrule, or is not balanced about the longitudinal axis of a multifiber ferrule, will not consistently produce dry physical contact between a mated pair of fiber optic connectors.

SUMMARY OF THE INVENTION

The above described and other deficiencies of conventional fiber optic connectors are addressed and overcome by a fiber optic connector according to the present invention that includes a multifiber ferrule and force centering means for applying an axial biasing force to the ferrule.

In one advantageous embodiment, a fiber optic connector includes a multifiber ferrule having an end face and an opposed rear face. The end face defines a plurality of optical fiber bores opening therethrough for receiving respective optical fibers and the fiber optic connector defines a longitudinal axis that is generally parallel to each of the optical fiber bores. The fiber optic connector further includes at least one force centering element for applying a biasing force to the ferrule in the direction of the longitudinal axis without generating a moment about a lateral axis defined by the end face of the ferrule. The fiber optic connector further includes a coil spring and a spring seat disposed between the coil spring and the ferrule. The spring seat has a forward portion that engages the rear face of the ferrule and a rearward portion opposite the forward portion. The at least one force centering element is disposed medially on the rearward portion of the spring seat in the form of a protrusion that extends outwardly from the rearward portion. The protrusion engages the coil spring that exerts the biasing force on the ferrule and the forward portion engages the rear face of the ferrule to transfer the biasing force to the ferrule.

Alternatively, the protrusion may be disposed medially on the forward portion of the spring seat that engages the rear face of the ferrule. The spring seat may also have an arcuate side wall for engaging an interior surface of a connector housing such that the spring seat is movable only in the direction of the longitudinal axis.

In another advantageous embodiment, a fiber optic connector includes a multifiber ferrule having an end face and an opposed rear face. The end face defines a plurality of optical fiber bores opening therethrough for receiving respective optical fibers and the fiber optic connector defines a longitudinal axis that is generally parallel to each of the optical fiber bores. The fiber optic connector further includes at least one force centering element for applying a biasing force to the ferrule in the direction of the longitudinal axis without generating a moment about a lateral axis defined by the end face of the ferrule. The fiber optic connector further includes a coil spring and a spring seat disposed between the coil spring and the ferrule. The end face of the ferrule defines a first lateral axis generally perpendicular to the longitudinal axis and the rear face defines a convex surface in the direction of the first lateral axis. The end face of the ferrule may further define a second lateral axis generally perpendicular to the longitudinal axis and to the first lateral axis and the rear face may further define a convex surface in the direction of the second lateral axis. Alternatively, the forward portion of the spring seat may define a convex surface in the direction of the first lateral axis and may further define a convex surface in the direction of the second lateral axis.

In another advantageous embodiment, a fiber optic connector includes a multifiber ferrule having an end face and an opposed rear face. The end face defines a plurality of optical fiber bores opening therethrough for receiving respective optical fibers and the fiber optic connector defines a longitudinal axis that is generally parallel to each of the optical fiber bores. The fiber optic connector further includes at least one force centering element for applying a biasing force to the ferrule in the direction of the longitudinal axis without generating a moment about a lateral axis defined by the end face of the ferrule. The fiber optic connector further includes a coil spring and a spring seat disposed between the coil spring and the ferrule. The spring seat has a forward portion for engaging the rear face of the ferrule and a rearward portion opposite the forward portion for engaging the coil spring. The ferrule is provided with at least one first force centering element disposed on an exterior surface of the ferrule medially between the end face and the rear face, and the spring seat is provided with at least one second force centering element disposed on the rearward portion. The spring seat may further have at least one transfer arm extending outwardly from the forward portion for transferring a portion of the biasing force to the at least one first force centering element on the ferrule. The end face of the ferrule further defines a first lateral axis perpendicular to the longitudinal axis and a second lateral axis perpendicular to the longitudinal axis and to the first lateral axis. Preferably, the ferrule is provided with a pair of first force centering elements spaced apart laterally in the direction of the second lateral axis and symmetrical about a plane comprising the second lateral axis and the longitudinal axis. Preferably, the spring seat is provided with a pair of second force centering elements spaced apart laterally in the direction of the first lateral axis and symmetrical about a plane comprising the first lateral axis and the longitudinal axis.

In another advantageous embodiment, a fiber optic connector includes a multifiber ferrule having an end face and an opposed rear face. The ferrule further has a plurality of optical fiber bores extending therethrough for receiving the end portions of respective optical fibers adjacent the end face and at least one guide pin hole for receiving a guide pin to align the multifiber ferrule with a mating multifiber ferrule. The guide pin hole defines an axis that is parallel to each of the optical fiber bores and the fiber optic connector defines a longitudinal axis that is generally parallel to the axis defined by the guide pin hole. The fiber optic connector further includes at least one force centering element for applying a resultant biasing force to the ferrule in the direction of the longitudinal axis such that the ferrule is not subjected to a moment about a lateral axis defined by the end face of the ferrule and generally perpendicular to the longitudinal axis.

In another advantageous embodiment, a multifiber ferrule is movably disposed within a fiber optic connector. The multifiber ferrule has an end face, an opposed rear face and a plurality of optical fiber bores extending between the end face and the rear face. The optical fiber bores open through the end face and the end face defines a plane that is generally perpendicular to each of the optical fiber bores. The multifiber ferrule further includes force centering means for exerting a biasing force on the ferrule such that the ferrule moves only in an axial direction that is parallel to each of the optical fiber bores and does not produce a moment about a lateral axis in the plane defined by the end face. The force centering means may be provided in the form of a coil spring and a spring seat disposed between the coil spring and the ferrule with a forward portion of the spring seat engaging the rear face of the ferrule and a rearward portion of the spring seat engaging the coil spring opposite the forward portion.

In another advantageous embodiment, a multifiber ferrule for a fiber optic connector includes a ferrule body extending between an end face and an opposed rear face. The ferrule body has a plurality of optical fiber bores opening through the end face. The end face defines a first lateral axis in a first direction and a second lateral axis in a second direction generally perpendicular to the first direction. The rear face of the ferrule body defines a first convex surface in the first direction and a second convex surface in the second direction. Preferably, the radius of curvature of the first convex surface in the first direction is smaller than the radius of curvature of the second convex surface in the second direction.

BRIEF DESCRIPTION OF THE DRAWINGS

The above described and other features, aspects, and advantages of the present invention are better understood when the following detailed description of the invention is read with reference to the accompanying drawings, wherein:

FIG. 8 is an exploded perspective view of a fiber optic connector according to yet another exemplary embodiment of the present invention;

FIG. 9 is a perspective view of the force centering assembly of the fiber optic connector shown in FIG. 8 illustrating the multifiber ferrule, the guide pins, the pin keeper, the spring seat and the coil spring;

FIG. 12 is an exploded perspective view of a fiber optic connector according to yet another exemplary embodiment of the present invention;

FIG. 13 is a partial top view of the force centering assembly of the fiber optic connector shown in FIG. 12 illustrating a portion of the multifiber ferrule, the spring seat and the coil spring;

FIG. 16 is an exploded perspective view of the force centering assembly of the fiber optic connector shown in FIG. 14 illustrating the multifiber ferrule, the guide pins, the pin keeper and the dual axis spring seat with the coil spring removed for purposes of clarity;

FIG. 17 is a perspective view of the fully assembled force centering assembly shown in FIG. 16;

DETAILED DESCRIPTION OF THE INVENTION

Figure 1:
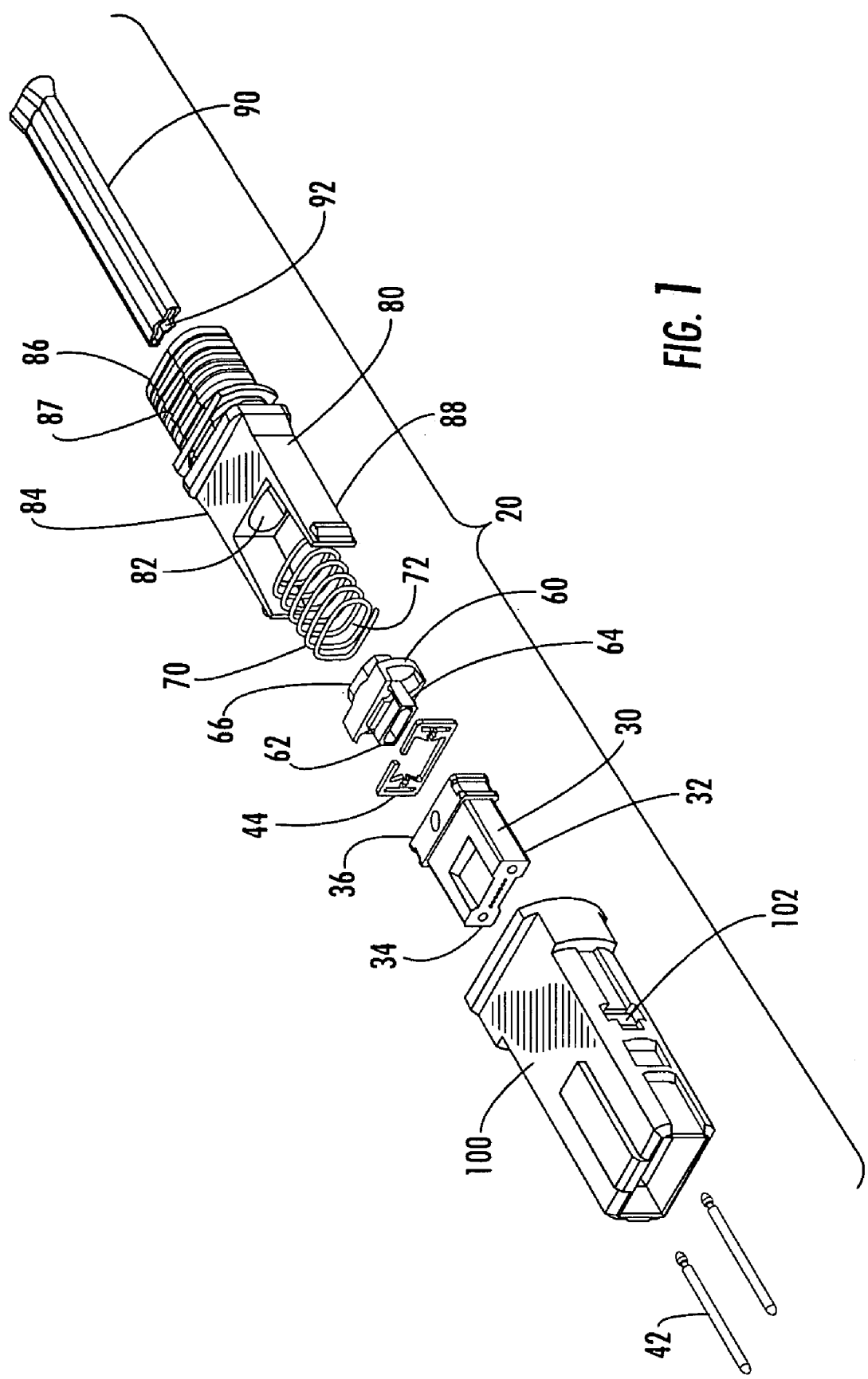
FIG. 1 is an exploded perspective view of a fiber optic connector according to an exemplary embodiment of the present invention.

The present invention now will be described more fully hereinafter with reference to the accompanying drawings, in which exemplary embodiments of the invention are shown, including the embodiment presently contemplated by the inventors as being the best mode of practicing the claimed invention. The invention may, however, be embodied in many different forms and should not be construed as limited to the embodiments set forth herein. Instead, these embodiments are provided so that this disclosure will be thorough and complete, and will fully convey the scope of the invention to those skilled in the art. Like reference numbers refer to like elements throughout the detailed description and the various drawings.

Referring now to the accompanying drawings, FIGS. 1–4 show a fiber optic connector 20 according to an exemplary embodiment of the present invention. The illustrated embodiment of the connector 20 comprises an MT-type multifiber ferrule 30 having a ferrule body 32 that is generally rectangular in lateral cross-section. Although an MT-style ferrule is illustrated and described herein, the multifiber ferrule 30 need not be an MT-type ferrule and may be any other type of multifiber ferrule. Regardless of the type, the ferrule 30 extends lengthwise within the connector 20 between an end face 34 and an opposed rear face 36. In addition, the ferrule body 32 defines a plurality of bores 38 opening through the end face 34. The bores 38 are arranged in a laterally extending linear row for receiving the end portions of respective optical fibers. Although the embodiments of the multifiber ferrule 30 illustrated herein define a total of twelve bores 38 such that the multifiber ferrule 30 can be mounted upon the end portions of twelve individual optical fibers, the end face 34 may define any number of bores, such as 2, 4, 6, 8, 10 or more. In addition, the multifiber ferrule 30 may comprise more than a single linear row of bores 38. Furthermore, the bores 38 need not be arranged in one or more laterally extending linear rows. For example, any number of bores 38 may be arranged in any predetermined pattern on the end face 34 of the ferrule 30.

The ferrule body 32 may also define at least one elongate guide pin hole 40 (FIG. 2) also referred to in the art as an alignment hole. The guide pin hole 40 opens through the end face 34 and is adapted to receive a respective guide pin 42 to align the ferrule 30 with an opposing ferrule of a mating connector in a known manner. In the exemplary embodiments shown herein, the multifiber ferrule 30 is an MT-type ferrule and the ferrule body 32 at least partially defines at least one and, more typically, a pair of guide pin holes 40 for receiving respective guide pins 42. Regardless of the type of ferrule 30, each elongate guide pin hole 40 defined by the ferrule body 32 in turn defines a longitudinal axis 50 (FIG. 2) extending through the center of the guide pin hole 40. The ferrule 30 is manufactured such that the longitudinal axis 50 of each guide pin hole 40 is precisely parallel to the bores 38 extending lengthwise through the ferrule body 32 and perpendicular to the end face 34. As illustrated in FIG. 1, the connector 20 has a male configuration because the ferrule 30 is provided with a pair of guide pins 42 and a guide pin retainer, or pin keeper, 44. The pin keeper 44 is positioned adjacent the rear face 36 of the ferrule body 32, as will be described, to secure the guide pins 42 within the guide pin holes 40. The guide pins 42 are secured such that their free ends protrude forwardly from the end face 34 of the ferrule body 32 a sufficient distance to engage the guide pin holes 40 of the ferrule of a mating connector, thereby aligning the optical fibers mounted within the respective bores 38 of the opposing ferrules. As is known, the free ends of the guide pins 42 may be tapered and/or the guide pins holes 40 may be provided with a lead-in chamfer to facilitate insertion of the guide pins 42 into the guide pin holes 40 and to reduce pin stubbing and/or damage to the end face 34 during mating of the opposing ferrules.

Figure 3:
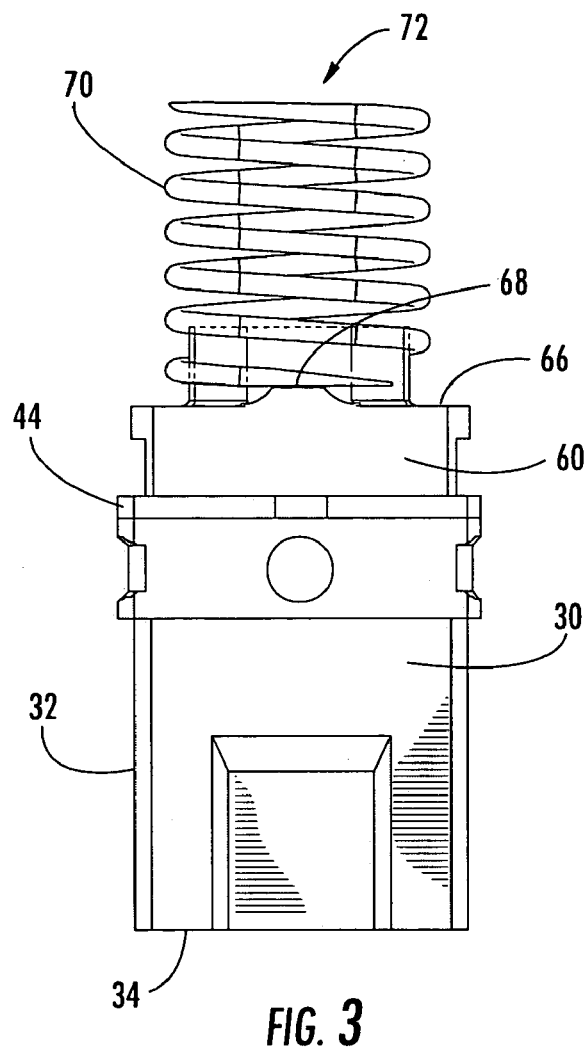
FIG. 3 is a top view of the force centering assembly shown in FIG. 2.

As illustrated herein, the connector 20 further comprises a spring seat 60, a coil spring 70, a spring push 80, a lead-in tube 90 and a generally hollow connector housing 100. The various components of the connector 20 and their functions are generally known. Thus, each component will not be described in detail herein except as necessary to enable one of ordinary skill in the art to understand and fully appreciate the present invention. Furthermore, it will be readily understood by those skilled in the art that each of the components may be configured in any number of different shapes, sizes and constructions without departing from the intended scope of the invention, as defined by the appended claims. Regardless, the spring seat 60 of the exemplary embodiment shown in FIG. 1 is positioned adjacent the rear face 36 of the ferrule body 32 between the ferrule 30 and the coil spring 70. An opening 62 extending lengthwise through the spring seat 60 permits the lead-in tube 90 and the end portions of the optical fibers (not shown) to pass through the spring seat 60 to the rear face 36 of the ferrule 30. The spring seat 60 comprises a forward portion 64 for engaging and retaining the pin keeper 44 between the spring seat 60 and the ferrule 30, and thereby securing the guide pins 42 within the guide pin holes 40 of the ferrule 30. As best shown in FIG. 3, the spring seat 60 further comprises a rearward portion 66 for receiving the coil spring 70 thereon. In particular, the rearward portion 66 of the spring seat 60 defines at least one force centering element 68 that engages the forward most coil of the coil spring 70, as will be described in greater detail hereinafter.

The coil spring 70 is positioned between the spring seat 60 and the spring push 80. An opening 72 extending lengthwise through the coil spring 70 permits the lead-in tube 90 and the end portions of the optical fibers (not shown) to pass through the coil spring 70 to the rear face 36 of the ferrule 30. In the fiber optic connector 20 described and shown herein, the coil spring 70 is a conventional helical spring having dead coils with ground ends in certain embodiments and open coils in other embodiments. The compressive force of the coil spring 70 may vary depending on the type of fiber optic connector and multifiber ferrule, but preferably is in the range of about 9–11 Newtons. The spring push 80 comprises a forward portion 84 for engaging the rearward most coil of the coil spring 70, and thereby retaining the coil spring 70 against the force centering element 68 defined by the spring seat 60. The spring push 80 further comprises a rearward portion 86 that defines a crimp body 87 for securing the strength members of a fiber optic cable (not shown) to the spring push 80 in a known manner. An opening 82 extending lengthwise through the spring push 80 permits the lead-in tube 90 and the end portions of the optical fibers (not shown) to pass through the spring push 80 to the rear face 36 of the ferrule 30. The lead-in tube 90 is positioned within the opening 82 of the spring push 80, the opening 72 of the coil spring 70 and the opening 62 of the spring seat 60. An opening 92 extending lengthwise through the lead-in tube 90 receives and guides the end portions of the optical fibers of the fiber optic cable into the respective bores 38 of the ferrule 30. Finally, the ferrule 30 and guide pins 42, the pin keeper 44, the spring seat 60, the coil spring 70, the forward portion 84 of the spring push 80 and the lead-in tube 90 are positioned within a connector housing 100. Flexible arms 88 provided on spring push 80 depend lengthwise from the forward portion 84 to engage openings 102 formed in the connector housing 100 to secure the spring push 80 to the connector housing 100. A forward mechanical stop (not shown) is provided on the interior surface of the connector housing 100 in a known manner so that the ferrule 30 is movably disposed within the connector housing 100, but is biased in the forward direction by the coil spring 70 and the spring seat 60.

When a pair of fiber optic connectors 20 is mated, the opposing ferrules 30 are typically brought into physical contact with one another so that the coil springs 70 each exert a biasing force on the respective ferrule 30. As a result, the end faces 34 of the opposing ferrules 30 and/or the opposing optical fibers are pressed into physical engagement and biased against one another. Because the coil spring and the ferrule are not constrained to move only in the axial direction within the connector housing, it is possible that the resultant biasing force exerted by a coil spring in a conventional fiber optic connector will not be entirely in the axial direction. As a result, the ferrule may rotate about one or both of the lateral axes X, Y defined by the end face 34 of the ferrule 30 shown in FIG. 2. For example, the coil spring 70 may buckle slightly and cause the biasing force to be concentrated along one of the edges of the spring seat 60. The unbalanced biasing force causes a moment to be applied to the ferrule body 32 about the corresponding lateral axis X, Y, which results in the end face 34 of the ferrule 30 having an angle other than normal relative to the longitudinal axis Z defined by the connector. If the end face 34 of the ferrule 30 is rotated about one or both of the lateral axes X, Y, certain of the opposing optical fibers may lose physical contact with one another, thereby creating a gap between the optical fibers that introduces back reflection and attenuation loss. Because the plurality of optical fibers are spaced apart in the direction of the lateral axis X in the illustrated embodiments, rotation of the ferrule body 32 about the lateral axis Y is significantly more critical than rotation of the ferrule body 32 about the lateral axis X. Specifically, separation between the opposing optical fibers will increase in the direction of rotation such that a substantial separation may occur between the outermost pair of opposing optical fibers. However, it will be readily apparent to one of ordinary skill in the art that rotation of the ferrule body about the lateral axis X can cause a significant increase in the back reflection and attenuation loss between opposing optical fibers in a mated pair of fiber optic connectors comprising multifiber ferrules having multiple rows of optical fibers.

Figure 2:
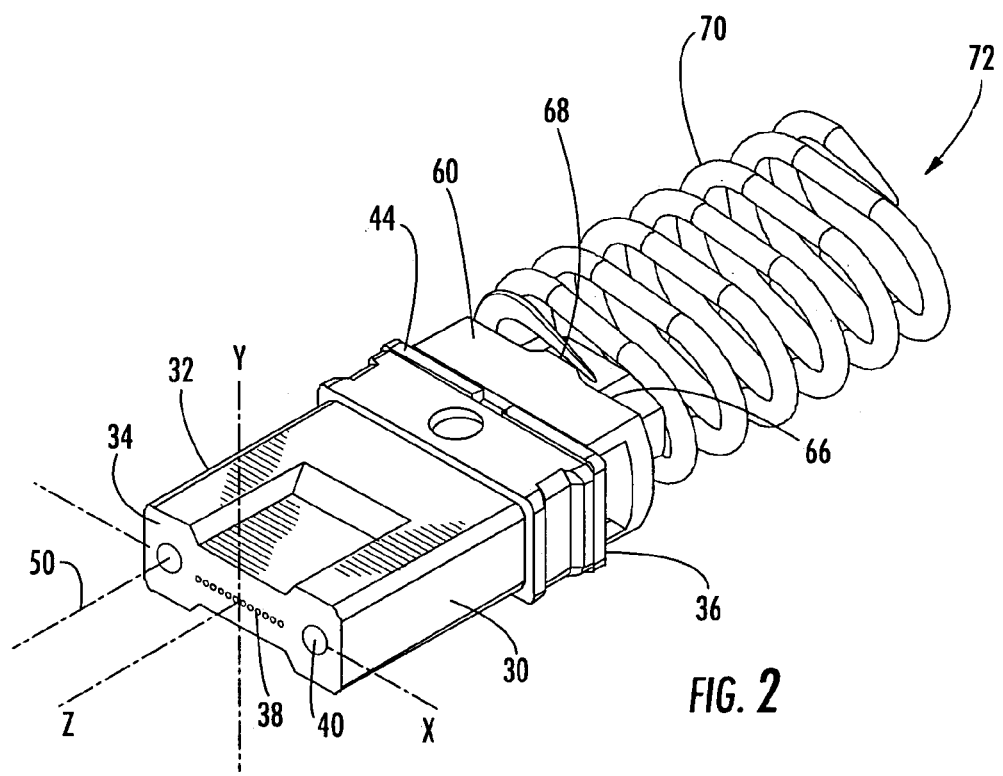
FIG. 2 is a perspective view of the force centering assembly of the fiber optic connector shown in FIG. 1 illustrating the multifiber ferrule, the spring seat and the coil spring.
Figure 4:
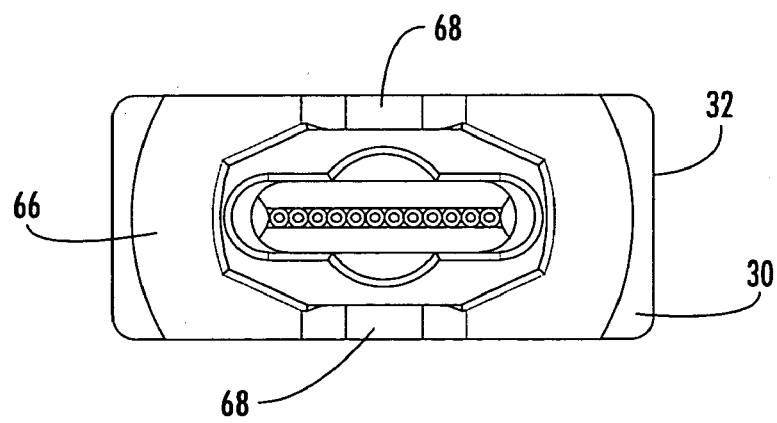
FIG. 4 is a rear end view of the force centering assembly shown in FIG. 2 with the coil spring removed for purposes of clarity.

In the present invention, a fiber optic connector comprising a multi fiber ferrule is provided with means for applying a biasing force along the longitudinal axis Z defined by the connector. In particular, a biasing force is applied to the ferrule body that is balanced about one or both of the lateral axes X, Y defined by the end face of the ferrule. As used herein, the term "force centering means" refers to the combination of structural elements that cause the resultant biasing force exerted by the coil spring on the ferrule body to be applied along the longitudinal axis Z defined by the connector. The term "axial biasing force" refers to a resultant biasing force exerted by the coil spring that is applied along the longitudinal axis Z defined by the connector. FIGS. 2–4 illustrate the force centering means of the fiber optic connector 20 shown in FIG. 1. In particular, FIGS. 2–4 illustrate the structural elements of the fiber optic connector 20 that combine to ensure that the coil spring 70 exerts a resultant axial biasing force on the ferrule 30 along the longitudinal axis Z of the connector so that the ferrule body 32 does not rotate about one or both of the lateral axes X, Y in the lateral plane defined by the end face 34. In the exemplary embodiment shown in FIGS. 1–4, the spring seat 60 is provided with at least one, and preferably a pair, of force centering elements 68 located medially on opposite sides of the rearward portion 66. The force centering elements 68 engage the forward most helical coil of the coil spring 70 and are arranged symmetrical to the longitudinal plane defined by the lateral axis Y and the longitudinal axis Z. Thus, any moment about the lateral axis Y introduced by the biasing force exerted by the coil spring 70 on the spring seat 60 and transferred to the ferrule 30 is minimized. Preferably, the biasing force is balanced about the lateral axis Y so that the resultant biasing force is aligned with the longitudinal axis Z. The force centering elements 68 are also located at equal distances on the rearward portion 66 of the spring seat 60 from the plane defined by the lateral axis X and the longitudinal axis Z. Thus, the biasing force exerted by the coil spring 70 on the spring seat 60 and transferred to the ferrule 30 is balanced about the lateral axis X so that the resultant biasing force is aligned with the longitudinal axis Z. As a result, an axial biasing force is applied to the multifiber ferrule 30 and the end face 34 does not rotate about one or both of the lateral axes X, Y normal to the longitudinal axis Z defined by the fiber optic connector 20.

Figure 5:
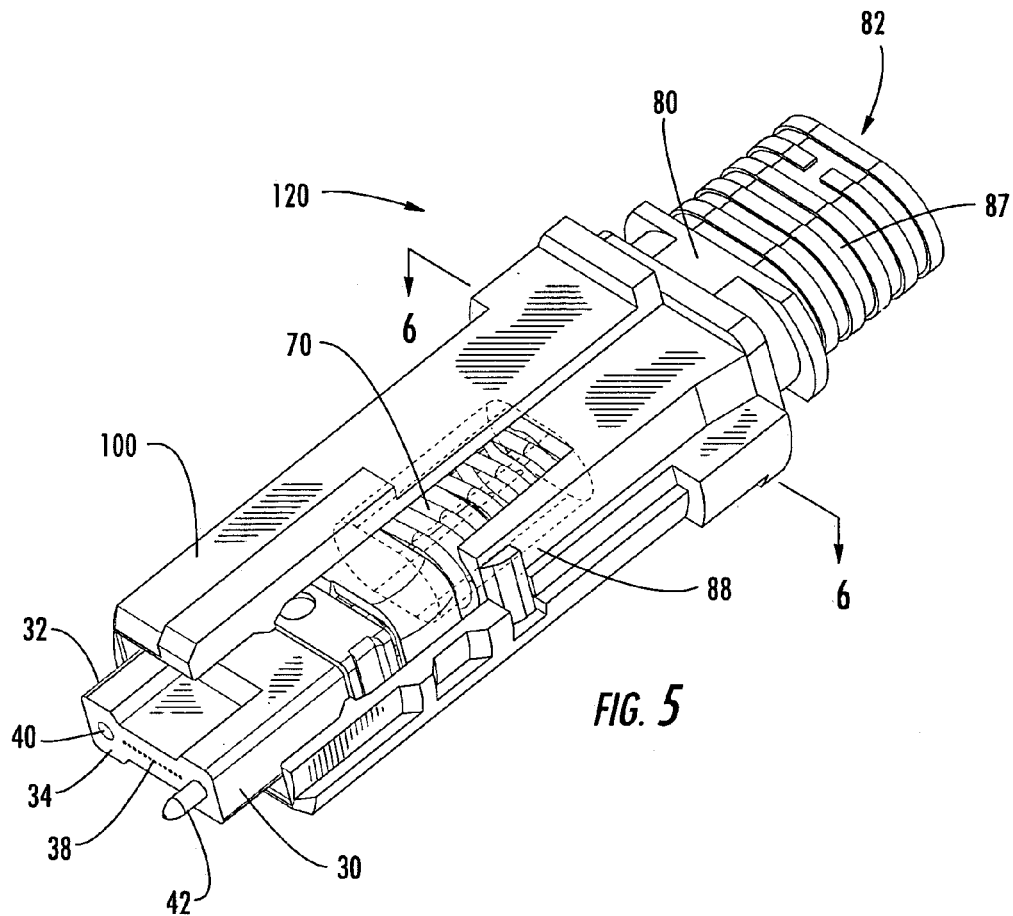
FIG. 5 is a perspective view of a fully assembled fiber optic connector according to another exemplary embodiment of the present invention.
Figure 6:
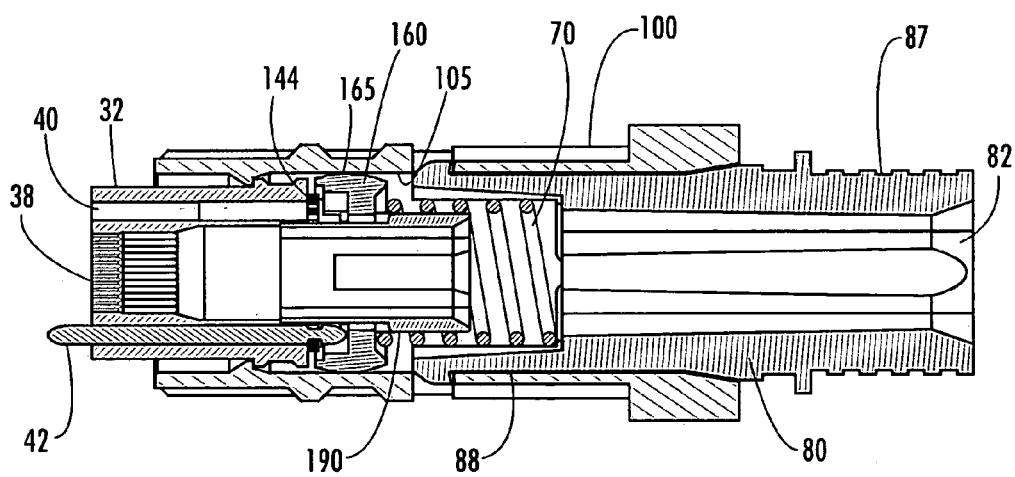
FIG. 6 is a lengthwise cross-sectional view of the fiber optic connector shown in FIG. 5 taken along the line 6—6 in FIG. 5.
Figure 7:
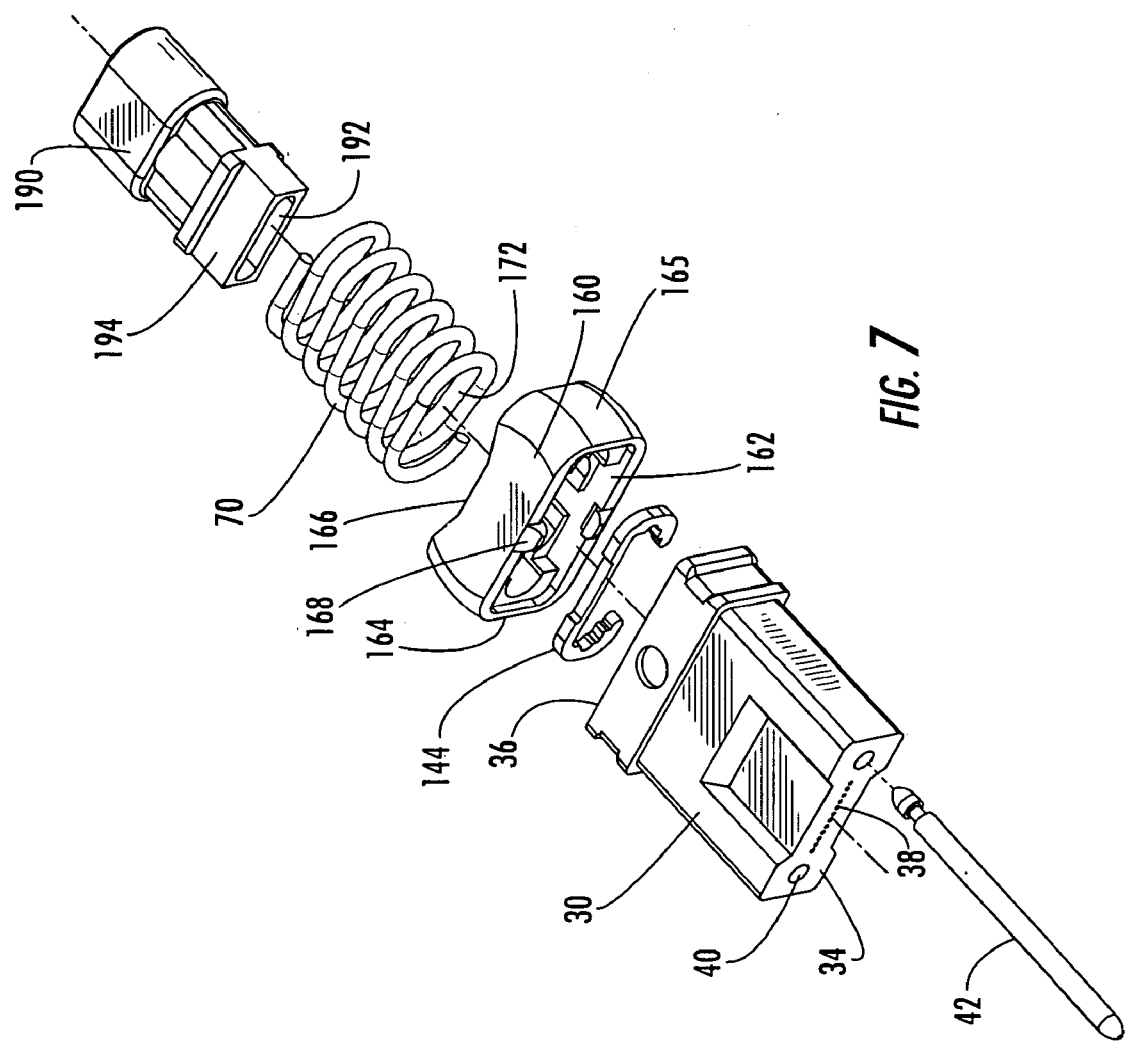
FIG. 7 is an exploded perspective view of the force centering assembly of the fiber optic connector shown in FIG. 5 illustrating the multifiber ferrule, a guide pin, the pin keeper, the spring seat, the coil spring and the lead-in tube.

FIGS. 5–7 show another exemplary embodiment of a fiber optic connector 120 according to the present invention. The connector 120 comprises a ferrule 30, at least one guide pin 42 received within a guide pin hole 40 opening through the end face 34 of the ferrule 30, a coil spring 70, a spring push 80 and a connector housing 100, that are configured substantially as previously described. Accordingly, the substantially similar components indicated by the like reference numbers will not be described in greater detail, except as necessary to explain the present exemplary embodiment. The connector 120 further comprises a pin keeper 144, a spring seat 160 and a lead-in tube 190 that are configured somewhat different than the pin keeper 44, spring seat 60 and lead-in tube 90 previously described in connection with the fiber optic connector 20. In particular, the pin keeper 144 is adapted to be received within a recess formed in the forward portion 164 of the spring seat 160 such that the pin keeper 144 is retained between the rear face 36 of the ferrule 30 and the forward portion 164 of the spring seat 160. The pin keeper 144 engages the ends of the guide pin(s) 42 as previously described to secure the guide pin(s) 42 within the guide pin hole(s) 40 extending lengthwise through the ferrule body 32. The lead-in tube 190 serves as a replacement for the lead-in tube 90 previously described and comprises a forward portion 194 that is shaped and configured to engage the rear face 36 of the ferrule body 32 in a slight interference fit. An opening 192 extending lengthwise through the lead-in tube 190 receives and guides the end portions of the optical fibers of the fiber optic cable into the respective bores 38 of the ferrule 30.

The spring seat 160 comprises a forward portion 164 adjacent the rear face 36 of the ferrule 30 and a rearward portion 166 opposite the forward portion 164 and adjacent the coil spring 70. An opening 162 extending lengthwise through the spring seat 160 allows the forward portion 194 of the lead-in tube 190 to pass through the spring seat 160 to the rear face 36 of the ferrule body 32. The opening 162 also receives the coil spring 70 therein such that the forward most helical coil of the coil spring 70 engages a shelf provided on the periphery of the spring seat 160 adjacent the rearward portion 166. At least one, and preferably a pair, of force centering elements 168 is also provided on the spring seat 160 adjacent the forward portion 164. Although shown herein on the forward portion 164 of the spring seat 160, one of ordinary skill will readily appreciate that the force centering elements 168 alternatively may be provided on the rear face 36 of the ferrule body 32. Similar to the pair of force centering elements 68 previously described, the force centering elements 168 are arranged symmetrical to the longitudinal plane defined by the lateral axis Y and the longitudinal axis Z. Thus, any moment about the lateral axis Y introduced by the biasing force exerted by the coil spring 70 on the spring seat 160 and transferred to the ferrule 30 is minimized. Preferably, the biasing force is balanced about the lateral axis Y so that the resultant biasing force is aligned with the longitudinal axis Z. Unlike the force centering elements 68, the force centering elements 168 of the spring seat 160 engage the rear face 36 of the ferrule body 32 directly (instead of the forward most helical coil of the coil spring 70). Thus, the force centering elements 168 are located closer to the end face 34 of the ferrule 30. As a result, the longitudinal distance between the location at which the biasing force is applied (i.e., the rear face 36 of the ferrule body 32) and the end face 34 of the ferrule 30 is substantially reduced. Accordingly, any moment introduced by the biasing force about the lateral axis Y is further reduced. The force centering elements 168 are also located at equal distances on the forward portion 164 of the spring seat 160 from the plane defined by the lateral axis X and the longitudinal axis Z. Thus, the biasing force exerted by the coil spring 70 on the spring seat 160 and transferred directly to the ferrule 30 is balanced about the lateral axis X so that the resultant biasing force is aligned with the longitudinal axis Z. As a result, an axial biasing force is applied to the multifiber ferrule 30 and the end face 34 does not rotate about one or both of the lateral axes X, Y normal to the longitudinal axis Z defined by the fiber optic connector 120. As best shown in the view FIG. 6, the spring seat 160 is provided with lateral exterior side walls 165 that are arcuate in shape in the direction of the longitudinal axis Z. The arcuate side walls 165 engage the lateral interior side walls 105 of the connector housing 100 so that the spring seat 160 is constrained against lateral movement, while at the same time being permitted to move forward and rearward in the axial direction (i.e., longitudinally). Because of the pivoting function of the force centering elements 168 and the sliding function of the side walls 165, the spring seat 160 of the fiber optic connector 120 is also referred to as a "piston rocker" spring seat.

FIGS. 8–11 show yet another exemplary embodiment of a fiber optic connector 220 according to the present invention. The connector 220 comprises at least one guide pin 42, a coil spring 70, a spring push 80, a lead-in tube (not shown) and a connector housing 100 that are configured substantially as previously described. Accordingly, the substantially similar components indicated by the like reference numbers will not be described in greater detail, except as necessary to explain the present exemplary embodiment. The connector 220 further comprises a ferrule 230 having at least one guide pin hole 240 opening through the end face 234 of the ferrule body 232 for receiving the guide pin(s) 42, a pin keeper 244 and a spring seat 260 that are configured somewhat different than the ferrule 30, the pin keepers 44 and 144, and the spring seats 60 and 160 previously described in connection with the fiber optic connectors 20 and 120. In particular, the ferrule body 232 comprises a slot 235 about its periphery adjacent the rear face 236 for receiving the pin keeper 244. The rear face 236 of the ferrule body 232 has a convex shape in the direction of the lateral axis X (FIG. 10) and a convex shape in the direction of the lateral axis Y. As shown, the radius of curvature of the rear face 236 in the direction of the lateral axis X is smaller than the radius of curvature of the rear face 236 in the direction of the lateral axis Y.

Figure 10:
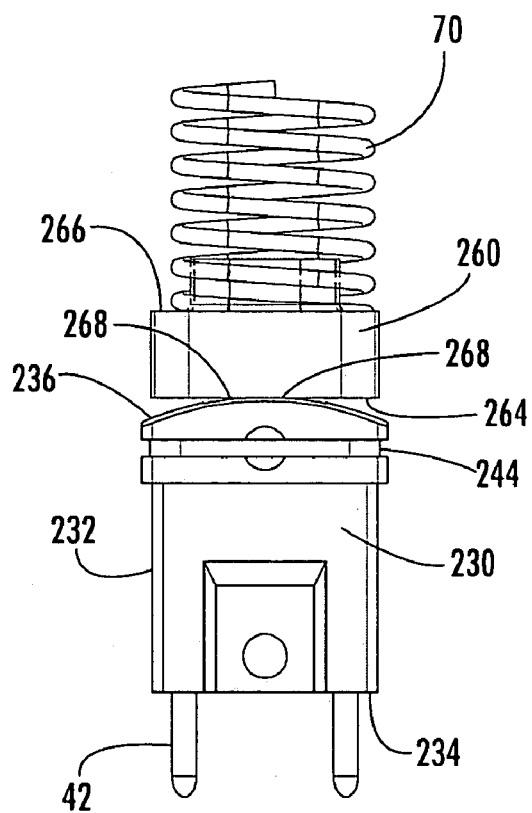
FIG. 10 is a top view of the force centering assembly shown in FIG. 9.
Figure 11:
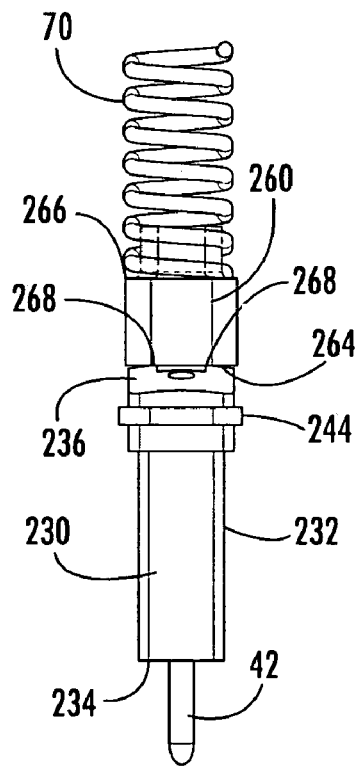
FIG. 11 is a side view of the force centering assembly shown in FIG. 9.
Figure 14:
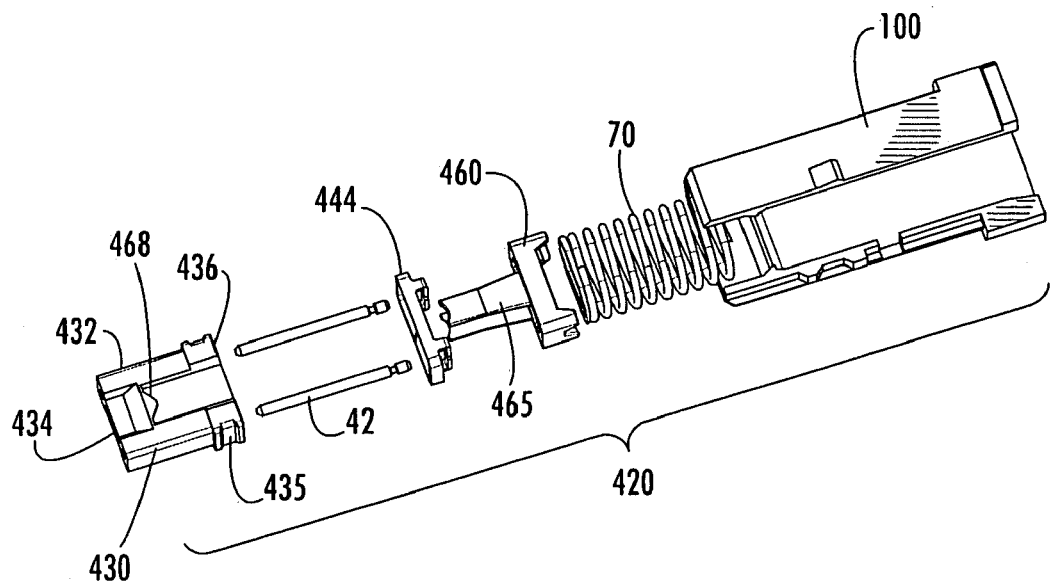
FIG. 14 is an exploded perspective view of a fiber optic connector according to a dual axis embodiment of the present invention.
Figure 15:
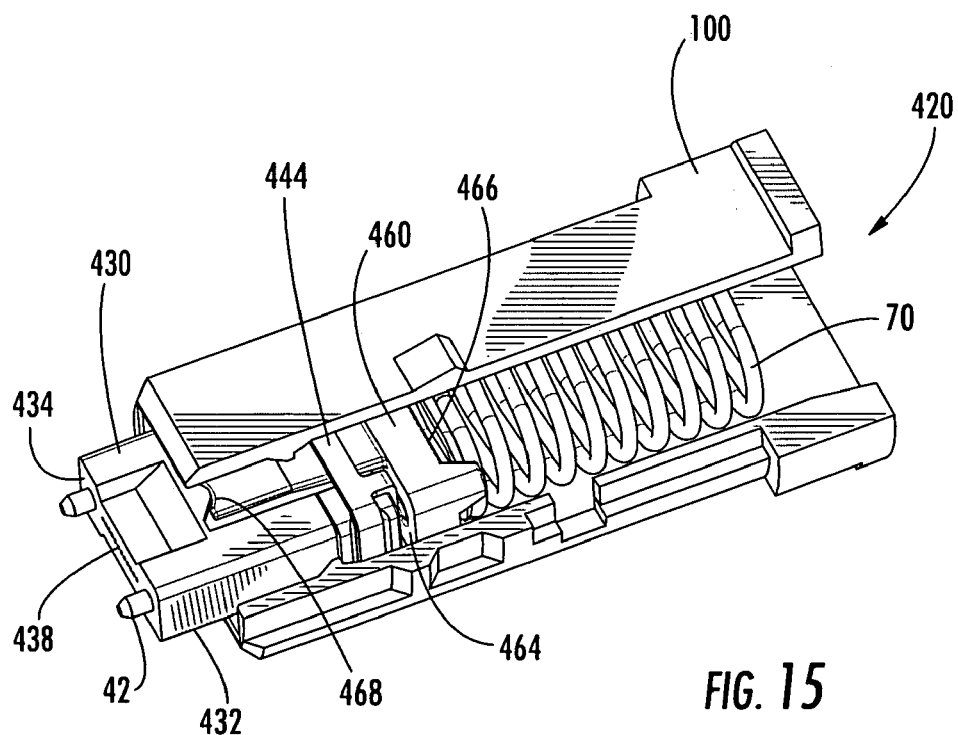
FIG. 15 is a perspective view of the fully assembled fiber optic connector shown in FIG. 14 with a portion of the connector housing removed for purposes of clarity.

The rear face 236 of the ferrule body 232 engages the planar forward portion 264 of the spring seat 260 and the planar rearward portion 266 of the spring seat 260 engages the forward most helical coil of the coil spring 70. Accordingly, the biasing force exerted by the coil spring 70 on the spring seat 260 is transferred to the convex-convex rear face 236 of the ferrule body 232. Similar to the pair of force centering elements 68 and 168 previously described, the rear face 236 of the ferrule 230 defines a pair of force centering elements 268 that is arranged symmetrical to the longitudinal plane defined by the lateral axis Y and the longitudinal axis Z (FIG. 10). Thus, any moment about the lateral axis Y introduced by the biasing force exerted by the coil spring 70 on the spring seat 260 and transferred to the ferrule 230 is minimized. Preferably, the biasing force is balanced about the lateral axis Y so that the resultant biasing force is aligned with the longitudinal axis Z. The forward portion 264 of the spring seat 260 directly engages the force centering elements 268 on the rear face 236 of the ferrule body 232. In addition, the force centering elements 268 are located nearer in the longitudinal direction to the end face 234 of the ferrule 230 than the coil spring 70. Accordingly, any moment introduced by the biasing force about the lateral axis Y or the lateral axis X is further reduced. The force centering elements 268 are located at equal distances on the rear face 236 of the ferrule body 232 from the plane defined by the lateral axis X and the longitudinal axis Z (FIG. 11). Thus, the biasing force exerted by the coil spring 70 on the spring seat 260 and transferred directly to the ferrule 230 is balanced about the lateral axis X so that the resultant biasing force is aligned with the longitudinal axis Z. As a result, an axial biasing force is applied to the multifiber ferrule 230 and the end face 234 does not rotate about one or both of the lateral axes X, Y normal to the longitudinal axis Z defined by the fiber optic connector 220.

FIGS. 12 and 13 show yet another exemplary embodiment of a fiber optic connector 320 according to the present invention. The connector 320 comprises at least one guide pin 42, a pin keeper 244, a coil spring 70, a spring push 80, a lead-in tube (not shown) and a connector housing 100 that are configured substantially as previously described. Accordingly, the substantially similar components indicated by the like reference numbers will not be described in greater detail, except as necessary to explain the present exemplary embodiment. The connector 320 further comprises a ferrule 330 having at least one guide pin hole 340 opening through the end face 334 of the ferrule body 332 for receiving the guide pin(s) 42, and a spring seat 360 that are configured somewhat different than the ferrules 30 and 230, and the spring seats 60, 160 and 260 previously described in connection with the fiber optic connectors 20, 120 and 220. In particular, the ferrule body 332 comprises a slot 335 about its periphery adjacent the rear face 336 for receiving the pin keeper 244. The rear face 336 of the ferrule body 332 defines a planar surface parallel to the end face 334, while the forward portion 364 of the spring seat 360 has a convex shape in the direction of the lateral axis X (FIG. 13) and a convex shape in the direction of the lateral axis Y (not shown). Preferably, the radius of curvature of the forward portion 364 in the direction of the lateral axis X is smaller than the radius of curvature of the forward portion 364 in the direction of the lateral axis Y.

The planar rear face 336 of the ferrule body 332 engages the convex-convex forward portion 364 of the spring seat 360 and the planar rearward portion 366 of the spring seat 360 engages the forward most helical coil of the coil spring 70. Accordingly, the biasing force exerted by the coil spring 70 on the spring seat 360 is transferred to the convex-convex forward portion 364 of the spring seat 360. Similar to the pair of force centering elements 68, 168 and 268 previously described, the forward portion 364 of the spring seat 360 defines a pair of force centering elements 368 that is arranged symmetrical to the longitudinal plane defined by the lateral axis Y and the longitudinal axis Z (FIG. 13). Thus, any moment about the lateral axis Y introduced by the biasing force exerted by the coil spring 70 on the spring seat 360 and transferred to the ferrule 330 is minimized. Preferably, the biasing force is balanced about the lateral axis Y so that the resultant biasing force is aligned with the longitudinal axis Z. The force centering elements 368 on the forward portion 364 of the spring seat 360 directly engage the rear face 336 of the ferrule body 332. In addition, the force centering elements 368 are located nearer in the longitudinal direction to the end face 334 of the ferrule 330 than the coil spring 70. Accordingly, any moment introduced by the biasing force about the lateral axis Y or the lateral axis X is further reduced. The force centering elements 368 are located at equal distances on the rear face 336 of the ferrule body 332 from the plane defined by the lateral axis X and the longitudinal axis Z. Thus, the biasing force exerted by the coil spring 70 on the spring seat 360 and transferred directly to the ferrule 330 is balanced about the lateral axis X so that the resultant biasing force is aligned with the longitudinal axis Z. As a result, an axial biasing force is applied to the multifiber ferrule 330 and the end face 334 does not rotate about one or both of the lateral axes X, Y normal to the longitudinal axis Z defined by the fiber optic connector 320. In short, the locations of the force centering elements and the respective functions of the ferrule and the spring seat are reversed in the fiber optic connector 320 (FIGS. 12 and 13) relative to the fiber optic connector 220 (FIGS. 8–11).

FIGS. 14–19 show an exemplary embodiment of a dual axis fiber optic connector 420 according to the present invention. The connector 420 comprises at least one guide pin 42, a coil spring 70, a spring push (not shown), a lead-in tube (not shown) and a connector housing 100 that are configured substantially as previously described. Accordingly, the substantially similar components indicated by the like reference numbers will not be described in greater detail, except as necessary to explain the present exemplary embodiment. The connector 420 further comprises a ferrule 430 having at least one guide pin hole 440 opening through the end face 434 of the ferrule body 432 for receiving the guide pin(s) 42, a pin keeper 444 and a spring seat 460 that are configured somewhat different than the ferrules 30, 230 and 330, the pin keepers 44, 144 and 244, and the spring seats 60, 160 and 260 previously described in connection with the fiber optic connectors 20, 120, 220 and 320. In particular, the ferrule body 432 comprises a pair of opposed slots 435 on its periphery adjacent the rear face 436 for receiving the pin keeper 444. The ferrule 430 further comprises a pair of first force centering elements 468 on the exterior surfaces of the ferrule body 432 in the direction of the lateral axis Y that are disposed medially between the end face 432 and the rear face 436. As shown, the force centering elements 468 are disposed nearer to the end face 432 than the rear face 436, for a purpose to be described. Each of the first force centering elements 468 on the ferrule body 432 has a convex shape in the direction of the lateral axis X (FIG. 18) that is disposed rearwardly. As shown, the radius of curvature of the first force centering elements 468 is substantially smaller than the radius of curvature of the rear face 236 of the ferrule 230 in the direction of the lateral axis X (FIG. 10) and the radius of curvature of the forward portion 364 of the spring seat 360 in the direction of the lateral axis X (FIG. 13).

The planar rear face 436 of the ferrule body 432 is received within a recess 446 formed in the forward side of the pin keeper 444. The rearward side of the pin keeper 444 defines at least a pair of spaced apart supports 448 for engaging the planar forward portion 464 of the spring seat 460. Each of the supports 448 defines a slot 445 for engaging one end of the guide pin 42. The rearward portion 466 of the spring seat 460 comprises a pair of second force centering elements 469 that engage the forward most helical coil of the coil spring 70. The second force centering elements 469 are spaced apart in the direction of the lateral axis X adjacent the periphery of the spring seat 460 and have a convex shape in the direction of the lateral axis Y. As shown, the radius of curvature of the convex second force centering elements 469 is about the same as the radius of curvature of the convex first force centering elements 468. Accordingly, a portion of the biasing force exerted by the coil spring 70 on the spring seat 460 is transferred to the pin keeper 444, and in turn, transferred to the ferrule body 432 through the slots 435. The spring seat 460 further comprises a pair of transfer arms 465 that are laterally spaced apart in the direction of the lateral axis Y and depend forwardly from the forward portion 464 of the spring seat 460 through the pin keeper 444 to the first force centering elements 468. The free end of each of the transfer arms 465 has a concave shape in the direction of the lateral axis X (FIG. 18) that is disposed rearwardly. The concave radius of curvature of the free ends of the transfer arms 465 is substantially the same as the convex radius of curvature of the first force centering elements 468. Thus, the free ends of the transfer arms 465 are configured to cooperate with the first force centering elements 468, as will be described. Accordingly, the remaining portion of the biasing force exerted by the coil spring 70 on the spring seat 460 is transferred through the transfer arms 465 to the first force centering elements 468.

Figure 18:
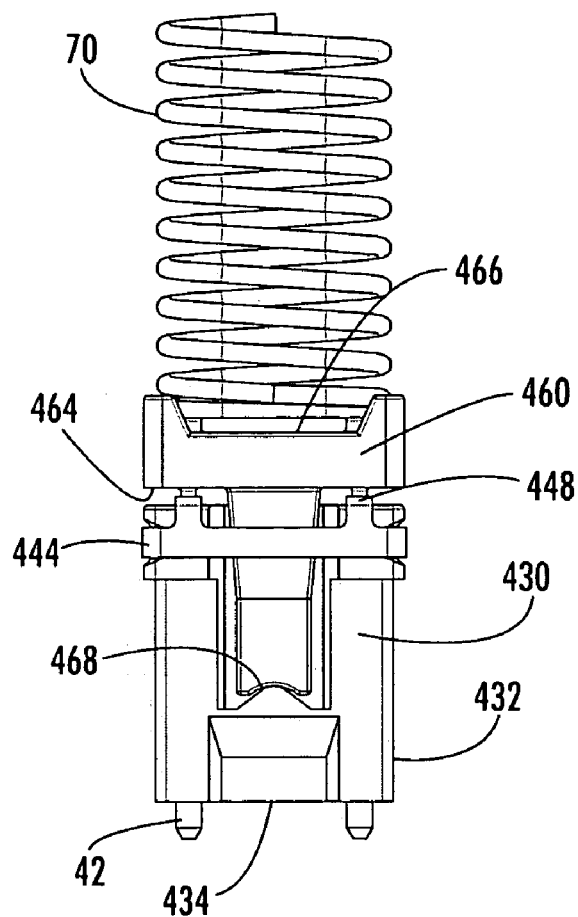
FIG. 18 is a top view of the force centering assembly shown in FIG. 17.
Figure 19:
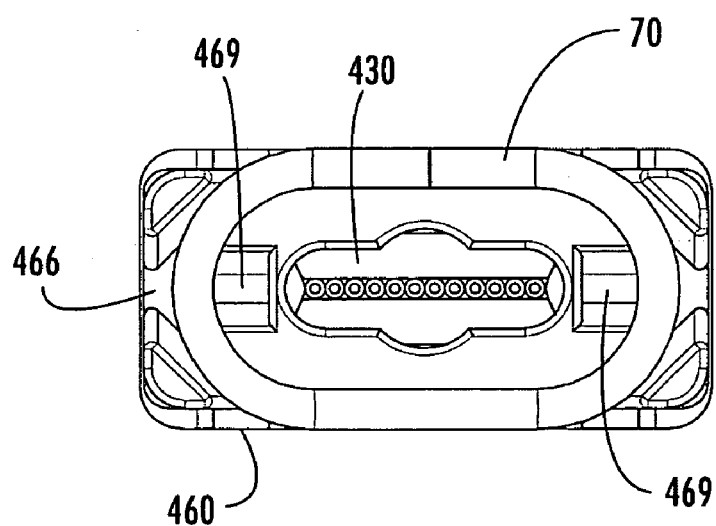
FIG. 19 is a rear end view of the force centering assembly shown in FIG. 17 with the coil spring removed for purposes of clarity.

Similar to the pair of force centering elements 68, 168, 268 and 368 previously described, the first pair of force centering elements 468 is arranged symmetrical to the longitudinal plane defined by the lateral axis Y and the longitudinal axis Z (FIG. 18). Thus, any moment about the lateral axis Y introduced by the biasing force exerted by the coil spring 70 on the spring seat 460 and transferred through the transfer arms 465 to the ferrule 430 is minimized. The convex radius of curvature of the first force centering elements 468 and the corresponding concave radius of curvature of the free ends of the transfer arms 465 cooperate to ensure that the biasing force exerted by the coil spring 70 is balanced about the lateral axis Y so that the resultant biasing force is aligned with the longitudinal axis Z. The transfer arms 465 of the spring seat 460 directly engage the first force centering elements 468 on the ferrule body 432 nearer in the longitudinal direction to the end face 434 of the ferrule 430 than the coil spring 70. Accordingly, any moment introduced by the biasing force about the lateral axis Y or the lateral axis X is further reduced. The first force centering elements 468 are located at equal distances on the exterior surface of the ferrule body 432 from the plane defined by the lateral axis X and the longitudinal axis Z. Thus, the biasing force exerted by the coil spring 70 on the spring seat 460 and transferred directly to the ferrule 430 is balanced about the lateral axis X so that the resultant biasing force is aligned with the longitudinal axis Z. Similarly, the second pair of force centering elements 469 is arranged symmetrical to the longitudinal plane defined by the lateral axis X and the longitudinal axis Z (FIG. 19). Thus, any moment about the lateral axis X introduced by the biasing force exerted by the coil spring 70 on the spring seat 460 and transferred through the pin keeper 444 to the ferrule 430 is minimized. The convex radius of curvature of the second force centering elements 469 ensures that the biasing force exerted by the coil spring 70 is balanced about the lateral axis X so that the resultant biasing force is aligned with the longitudinal axis Z. The second force centering elements 469 are located at equal distances on the rearward portion 466 of the spring seat 460 from the plane defined by the lateral axis Y and the longitudinal axis Z. Thus, the biasing force exerted by the coil spring 70 on the spring seat 460 and transferred to the ferrule 430 is balanced about the lateral axis Y so that the resultant biasing force is aligned with the longitudinal axis Z. As a result, an axial biasing force is applied to the multifiber ferrule 430 and the end face 434 does not rotate about one or both of the lateral axes X, Y normal to the longitudinal axis Z defined by the fiber optic connector 420. Because the first force centering elements 468 and the second force centering elements 469 simultaneously convert the biasing force exerted by the coil spring 70 on the ferrule 430 to an axial force in the direction of the longitudinal axis Z, the fiber optic connector 420 is also referred to as a "dual axis" force centering fiber optic connector.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims. Although specific terms have been employed herein, they are used in a generic and descriptive sense only and not for purposes of limitation.

That which is claimed is:

1. A fiber optic connector comprising:
   a multifiber ferrule having an end face and an opposed rear face, the end face defining a plurality of optical fiber bores opening therethrough for receiving respective optical fibers, the fiber optic connector defining a longitudinal axis that is generally parallel to the optical fiber bores and the end face defining at least one lateral axis generally perpendicular to the longitudinal axis;
   means for applying a biasing force to the ferrule in the direction of the longitudinal axis;
   a spring seat having a forward portion that engages the rear face of the ferrule and a rearward portion opposite the forward portion; and
   at least one pair of spaced apart force centering elements, the force centering elements engaging one of the ferrule and the biasing force means to balance the biasing force about the lateral axis defined by the end face of the ferrule;
   wherein the force centering elements are medially disposed on the rearward portion of the spring seat and each force centering element comprises a protrusion that extends outwardly from the rearward portion.

2. A fiber optic connector according to claim 1 wherein the protrusion engages the biasing force means that exerts the biasing force on the ferrule and wherein the forward portion of the spring seat engages the rear face of the ferrule to transfer the biasing force to the ferrule.

3. A fiber optic connector comprising:
   a multifiber ferrule having an end face and an opposed rear face, the ferrule having a plurality of optical fiber bores extending therethrough for receiving the end portions of respective optical fibers adjacent the end face, the ferrule further having at least one guide pin hole for receiving a guide pin to align the multifiber ferrule with a mating multifiber ferrule, the guide pin hole defining an axis that is parallel to the optical fiber bores, the fiber optic connector defining a longitudinal axis that is generally parallel to the axis defined by the guide pin hole and at least one lateral axis generally perpendicular to the longitudinal axis;
   means for applying a biasing force to the ferrule in the direction of the longitudinal axis;
   a spring seat having a forward portion that engages the rear face of the ferrule and a rearward portion opposite the forward portion; and
   at least a pair of spaced apart force centering elements disposed symmetrically about the lateral axis to apply a resultant biasing force to the ferrule in the direction of the longitudinal axis such that the furrule is not subjected to a moment about the lateral axis;

wherein the force centering elements are medially disposed on the rearward portion of the spring seat and each force centering element comprises a protrusion that extends outwardly from the rearward portion.

4. A fiber optic connector comprising:

a multifiber ferrule movably disposed within the fiber optic connector and having an end face, an opposed rear face and a plurality of optical fiber bores extending between the end face and the rear face, the optical fiber bores opening through the end face and the end face defining a plane that is generally perpendicular to the optical fiber bores and a longitudinal axis generally parallel to the optical fiber bores;

means for applying a biasing force to the ferrule;

a spring seat having a forward portion that engages the rear face of the ferrule and a rearward portion opposite the forward portion; and at least a pair of spaced apart force centering means disposed symmetrically about the longitudinal axis for balancing the biasing force applied to the ferrule such that the ferrule moves only in a direction that is parallel to the optical fiber bores and does not produce a moment about a lateral axis in the plane defined by the end face;

wherein the force centering elements are medially disposed on the rearward portion of the spring seat and each force centering element comprises a protrusion that extends outwardly from the rearward portion.

* * * * *